United States Patent
Popp et al.

(10) Patent No.: US 7,965,943 B2
(45) Date of Patent: Jun. 21, 2011

(54) MULTI-CHANNEL OPTICAL ROTARY TRANSMISSION DEVICE WITH HIGH RETURN LOSS

(75) Inventors: Gregor Popp, Munich (DE); Josef Bräu, Munich (DE); Matthias Rank, Willmering (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 786 days.

(21) Appl. No.: 11/962,333

(22) Filed: Dec. 21, 2007

(65) Prior Publication Data

US 2010/0266294 A1    Oct. 21, 2010

(30) Foreign Application Priority Data

Dec. 22, 2006 (DE) .......................... 10 2006 062 335
Mar. 20, 2007 (DE) .......................... 10 2007 013 923

(51) Int. Cl.
*H04B 10/12* (2006.01)
*G02B 6/34* (2006.01)
*G02B 6/26* (2006.01)

(52) U.S. Cl. ............ 398/142; 398/156; 385/25; 385/26; 385/36

(58) Field of Classification Search .................. 398/142, 398/156, 168; 385/26, 36, 25
See application file for complete search history.

(56) References Cited

U.S. PATENT DOCUMENTS

| | | | |
|---|---|---|---|
| 4,109,998 A | 8/1978 | Iverson | |
| 4,325,584 A | 4/1982 | Christ et al. | |
| 4,641,915 A | 2/1987 | Asakawa et al. | |
| 4,725,116 A | 2/1988 | Spencer et al. | |
| 4,858,292 A | 8/1989 | Buhlmann et al. | |
| 4,872,737 A | 10/1989 | Fukahori et al. | |
| 5,039,193 A * | 8/1991 | Snow et al. | 385/25 |
| 5,073,040 A * | 12/1991 | Guinard | 385/26 |
| 5,115,481 A | 5/1992 | Buhrer | |
| 5,157,745 A | 10/1992 | Ames | |
| 5,271,076 A | 12/1993 | Ames | |
| 5,317,659 A | 5/1994 | Lee | |
| 5,442,721 A | 8/1995 | Ames | |

(Continued)

FOREIGN PATENT DOCUMENTS

AT    410603    6/2003

(Continued)

OTHER PUBLICATIONS

Office Action Mailed Oct. 30, 2009 for U.S. Appl. No. 11/563,371.

(Continued)

*Primary Examiner* — Nathan M Curs
(74) *Attorney, Agent, or Firm* — Kevin L. Daffer; Daffer McDaniel, LLP

(57) ABSTRACT

An optical rotating data transmission device comprises a first collimator arrangement for coupling-on first light-waveguides, and a second collimator arrangement for coupling-on second light-waveguides, which is supported to be rotatable relative to the first collimator arrangement about a rotation axis. A Dove prism is provided between the collimator arrangements as a derotating element. Furthermore, the collimator arrangements pre provided with adapter elements having rotationally symmetrical conical faces. Prism adapter elements are disposed on the end faces of the Dove prism and have prism adapter elements on the sides facing the collimator arrangements. These also have rotationally symmetrical conical faces with a surface configuration that is inverse to that of the adapter elements of the collimator arrangements.

9 Claims, 2 Drawing Sheets

U.S. PATENT DOCUMENTS

| | | | |
|---|---|---|---|
| 5,568,578 | A | 10/1996 | Ames |
| 5,588,077 | A * | 12/1996 | Woodside ................ 385/26 |
| 6,192,175 | B1 | 2/2001 | Li et al. |
| 6,236,787 | B1 | 5/2001 | Laughlin |
| 6,263,133 | B1 | 7/2001 | Hamm |
| 6,360,032 | B1 | 3/2002 | Berger et al. |
| 6,441,960 | B1 * | 8/2002 | Wang et al. ............ 359/497 |
| 6,782,160 | B2 | 8/2004 | Townsend et al. |
| 6,823,142 | B1 | 11/2004 | Tanaka et al. |
| 6,862,383 | B2 | 3/2005 | Kikuchi et al. |
| 7,076,131 | B2 | 7/2006 | Bolle |
| 7,142,747 | B2 | 11/2006 | Oosterhuis et al. |
| 7,239,776 | B2 | 7/2007 | Oosterhuis et al. |
| 7,246,949 | B2 | 7/2007 | Thiele et al. |
| 7,298,538 | B2 | 11/2007 | Guynn et al. |
| 7,352,929 | B2 | 4/2008 | Hagen et al. |
| 7,372,230 | B2 | 5/2008 | McKay |
| 7,373,041 | B2 | 5/2008 | Popp |
| 7,433,556 | B1 | 10/2008 | Popp |
| 2002/0094163 | A1 | 7/2002 | Ooyama et al. |
| 2003/0099454 | A1 | 5/2003 | Chang |
| 2004/0017984 | A1 | 1/2004 | Thiele et al. |
| 2005/0036735 | A1 | 2/2005 | Oosterhuis et al. |
| 2005/0119529 | A1 | 6/2005 | Farr et al. |
| 2006/0110092 | A1 | 5/2006 | Ikeda |
| 2007/0019908 | A1 * | 1/2007 | O'Brien et al. ............ 385/36 |
| 2007/0053632 | A1 | 3/2007 | Popp |
| 2007/0237528 | A1 | 10/2007 | Popp |
| 2008/0106711 | A1 | 5/2008 | Beierl et al. |
| 2008/0175535 | A1 | 7/2008 | Popp et al. |
| 2008/0226231 | A1 | 9/2008 | Popp |
| 2008/0317407 | A1 | 12/2008 | Popp |

FOREIGN PATENT DOCUMENTS

| | | |
|---|---|---|
| DE | 1300002 | 7/1969 |
| DE | 1575515 | 3/1970 |
| DE | 74062 | 6/1970 |
| DE | 1772492 | 2/1972 |
| DE | 3207469 | 9/1982 |
| DE | 19809823 | 9/1999 |
| DE | 20105786 | 7/2001 |
| DE | 69704782 | 11/2001 |
| DE | 69704783 | 11/2001 |
| DE | 10029206 | 1/2002 |
| DE | 10029209 | 1/2002 |
| DE | 102004026498 | 12/2005 |
| DE | 60019966 | 2/2006 |
| DE | 102006022023 | 11/2006 |
| DE | 102005056899 | 5/2007 |
| EP | 0490054 | 6/1992 |
| EP | 0588039 | 3/1994 |
| EP | 1345051 | 9/2003 |
| EP | 1359452 | 11/2003 |
| EP | 1476969 | 1/2005 |
| GB | 2005044 | 4/1979 |
| JP | 63208821 | 8/1988 |
| JP | 2113213 | 4/1990 |
| JP | 2141708 | 5/1990 |
| WO | 01/98801 | 12/2001 |
| WO | 03/069392 | 8/2003 |

OTHER PUBLICATIONS

Notice of Allowance mailed Jan. 12, 2010 for U.S. Appl. No. 12/045,965.
Notice of Allowance mailed Jan. 26, 2010 for U.S. Appl. No. 11/563,371.
Office Action mailed Feb. 1, 2010 for U.S. Appl. No. 12/144,106.
Hecht, Optik, © 1974 Addison-Wesley Publishing, 8 pages.
Schleifring, "Mikrooptischer Dreguebertrager," 2005, 12 pages.
Office Action mailed Jul. 8, 2008 for U.S. Appl. No. 12/045,965.
Final Office Action mailed Mar. 16, 2009 for U.S. Appl. No. 12/045,965.
Office Action mailed Apr. 3, 2009 for U.S. Appl. No. 12/144,106.
Office Action mailed Apr. 5, 2007 for U.S. Appl. No. 11/469,004.
Notice of Allowance mailed Oct. 10, 2007 for U.S. Appl. No. 11/469,004.
Notice of Allowance mailed Jan. 7, 2008 for U.S. Appl. No. 11/469,004.
Office Action mailed Feb. 22, 2008 for U.S. Appl. No. 11/766,361.
Notice of Allowance mailed Jul. 14, 2008 for U.S. Appl. No. 11/766,361.
Office Action mailed Aug. 28, 2009 for U.S. Appl. No. 12/045,965.

* cited by examiner

MULTI-CHANNEL OPTICAL ROTARY TRANSMISSION DEVICE WITH HIGH RETURN LOSS

CROSS REFERENCE TO RELATED APPLICATIONS

This United States patent application claims priority from German application No. 10 2006 062 335.5 filed on Dec. 22, 2006 (now abandoned) and pending German application No. 10 2007 013 923.5 filed on Mar. 20, 2007.

BACKGROUND OF THE INVENTION

1. Field of the Invention

The invention relates to a device for transmitting optical signals between units that are rotatable relative to each other, also termed a rotary coupling or rotary joint. With this, a plurality of optical signals are to be transmitted simultaneously along a plurality of channels.

2. Description of the Prior Art

An optical rotary data transmission device for a plurality of channels, comprising a Dove prism, is disclosed in U.S. Pat. No. 5,568,578. For coupling light into or out of glass fibers, an arrangement comprising a plurality of GRIN lenses is provided. The light is refracted at the light entry faces of the Dove prism in accordance with the refractive indices of the glass of the Dove prism and the surroundings. The function of the prism is thus dependent upon the refractive index of a medium surrounding the prism.

An optical rotating data transmitting device for a plurality of channels, comprising a Dove prism as a derotating element, is disclosed in US 2005/0036735. Light from supply light-waveguides is coupled via collimators into a Dove prism to be derotated thereby, and then fed via other collimators into lead-away light-waveguides. In order to make the arrangement independent of the refractive index of a medium in the surroundings of the Dove prism, the prism is provided with supplementary members which ensure a perpendicular light entry. Owing to this perpendicular light entry, no refraction occurs at the interface. A disadvantage of this is a partial reflection of the light from the perpendicular interface, so that at least a part of the light is coupled back into the light guide. This results in a relatively low return loss.

Another kind of optical rotary data transmission device is disclosed in WO 01/98801 A2. Thus, this describes a micro-optical system having optical and mechanical components in the form of a one-piece component part. This design makes it possible to achieve a substantially higher packing density of the individual glass fibers. Once again, the parallel light entry and light exit faces that cause a relatively low return loss are of disadvantage.

A disadvantage of the known prior art is that relatively strong reflections of the transmitted light occur inside the rotating data transmission device.

BRIEF SUMMARY OF THE INVENTION

The invention is based on the object of improving a rotating data transmission device for multi-channel transmission of optical signals, and particularly of designing it so that the optical return loss of the arrangement is improved.

In accordance with the invention, this object is achieved by an optical rotating data transmission device comprising: at least one first collimator arrangement for coupling-on first light-waveguides; at least one second collimator arrangement for coupling-on second light-waveguides, which is supported to be rotatable relative to the first collimator arrangement about a rotation axis; a derotating optical element located in a light path between the first collimator arrangement and the second collimator arrangement; and a first prism adapter element and a second prism adapter element, each disposed on a respective side of the one derotating optical element; wherein the collimator arrangements comprise adapter elements having on their sides facing the one derotating optical element at least one rotationally symmetrical conical face, and the prism adapter elements have faces configured to be inverse thereto, each comprising at least one rotationally symmetrical and oppositely directed conical face.

BRIEF DESCRIPTION OF THE DRAWINGS

In the following the invention will be described by way of example, without limitation of the general inventive concept, on examples of embodiment and with reference to the drawings.

DETAILED DESCRIPTION OF PREFERRED EMBODIMENTS

Figure 1:
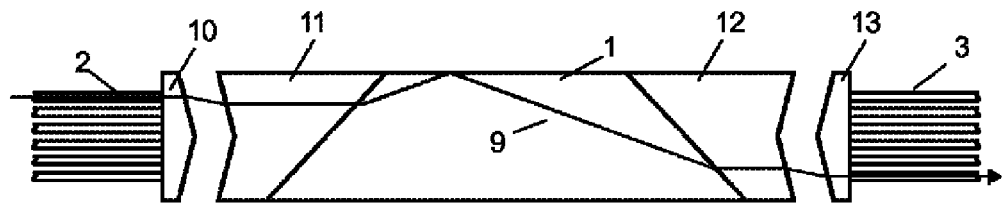
FIG. 1 schematically shows in a general form an arrangement in accordance with the invention.

The device in accordance with the invention comprises two collimator arrangements 4, 5 that are disposed to rotate relative to each other about a rotation axis 6. An optical path for transmission of light is present between the first collimator arrangement 4 and the second collimator arrangement 5 disposed to be rotatable relative thereto. In this optical path at least one derotating element is present, for example a Dove prism 1, which ensures an imaging of the light emitted from the first collimator arrangement 4 on the second collimator arrangement 5, and similarly also in the opposite direction, independently from the rotational movement between the two collimators. For this, the Dove prism is rotated at one half of the angular velocity of the rotation of the first collimator arrangement 4 and the second collimator arrangement 5.

Each of the collimator arrangements 4, 5 comprises at least one collimator and also at least one means for supporting the at least one collimator. Here the term collimator is used in its widest sense to denote a beam guiding or beam shaping element. The purpose of a collimator of this kind consists of converting the light guided in a light-waveguide, for example a single-mode fiber or also a multi-mode fiber, to a beam path which can be passed through the rotating data transmission device and, in particular, through the derotating element. This corresponds to a beam path in free space or in an optical medium such as, for example glass or oil. Similarly, a conversion can be effected also in the opposite direction, i.e. from the beam path in the rotating data transmission device to a light-waveguide. Of course, conversions in both directions within a collimator are also conceivable, so that bidirectional signals can be transmitted. Typically, the collimator lenses are particularly preferred to be gradient-index lenses (GRIN lenses).

In accordance with the invention, each of the collimator arrangements 4, 5 is provided with at least one adapter element that has on its side facing the prism at least one rotationally symmetrical face disposed at an angle deviating from the perpendicular to the rotation axis 6. A face of this kind is preferably configured to be a conical face, or at least a segment of a conical face. Accordingly, the face forms a straight circular cone having a height greater than 0. The angle at the cone apex is close to 180° without attaining this value, because then instead of a cone a plane surface would be present which in turn could cause reflections into the emitting light-waveguides. The conical face is at an angle preferably in the range of 0.1° to 5° to the rotation axis. A preferred angle is in the range of 0.5° to 1.5°. Particularly preferred is 0.9°. Optionally the cone may project into or from the face. Two prism adapter elements 11, 12 are provided on the Dove prism 1 to correspond to the adapter elements of the collimator arrangements. On their sides facing the prism, these prism adapter elements are shaped to correspond to the prism, so that they have as much face contact as possible with the prism. On the sides facing the collimators, the prism adapter elements have a surface geometry that is inverse to the surface geometry of the adapter elements of the collimators. If, for example, the adapter element of the first collimator arrangement 4 forms a cone projecting outwards in the direction of the prism, then the face of the assigned prism adapter element is cone shaped to project into the prism adapter element. If a prism adapter element and the assigned adapter element of a collimator were to be brought close to each other, then they would fit together without any gap.

Here the conical faces always refer to a segment of a cone having a cut-off apex, with the sectional face extending parallel to the base face of the cone and perpendicular to the axis of the cone The axis of the cone corresponds to the rotation axis 6.

Similarly an arrangement according to the invention can also have a plurality of rotationally symmetrical faces disposed to be rotationally symmetrical. An arrangement of this kind can be similar to a Fresnel lens. However, as distinct from a Fresnel lens, conical faces are used here instead of lens segments. In the collimator arrangements with adapter elements 10, 13, the individual conical faces are disposed appropriately opposite to the conical faces of the prism adapter elements 11, 12.

By means of an arrangement in accordance with the invention, surfaces perpendicular to the beam path are avoided. According to prior art, vertical surfaces are present at least on the adapter elements. Reflections at these faces are then mirrored back with high accuracy into the opposite collimator of the same beam path. This leads to relatively high reflections of the optical signal fed in. In accordance with the invention, these perpendicular faces are avoided. With this, light reflected from a face is no longer reflected back into the opposite collimator. At the same time, a functioning of the arrangement is ensured that is independent from the medium inside the inner space of the rotating data transmission device. Thus, the inside of the rotating data transmission device may be filled with a liquid such as water or oil. Similarly, it may contain a gas. In the prism a radial displacement of the light beam with respect to the collimator arrangements results in dependence upon the refractive index of the medium and the refractive index of the adapter elements. However, because this displacement occurs on both sides of the arrangement but in opposite directions owing to the derotating element, it is compensated. Thus no displacement of the light beam occurs within the collimator arrangement on the first side and the collimator arrangement on the second side. A prerequisite for this is that the medium on the inside of the rotating data transmission device has a constant refractive index. The adapter elements are made preferably of a glass or a synthetic resin.

FIG. 1 shows in a schematic form a sectional view along a rotation axis 6 of an arrangement in accordance with the invention. The optical rotating data transmission device comprises a first collimator arrangement with adapter element 10 for coupling-on of light-waveguides 2, and also a second collimator arrangement with adapter element 13 for coupling-on further light-waveguides 3. The first collimator arrangement with adapter element 13, and also the second collimator arrangement with adapter element 13 are configured to be conical on their sides facing the prism 1, wherein the cones protrude from the faces of the collimator arrangements. Corresponding to this, a first prism adapter element 11 and a second prism adapter element 13 are joined to the prism 1. The faces of the prism adapter elements that are directed towards the collimator arrangements are configured to be inverse to the assigned adapter elements of the collimator arrangements. In this case, conical end faces have been formed which are directed inwardly towards the prism 1. The ray path of a light ray 9 clearly shows the manner of functioning of the arrangement. Light which is coupled into the arrangement parallel to the rotation axis 6, for example through one of the first light-waveguides 2, is widened by the first collimator arrangement with adapter element 10. Thus, for example, light which is guided in a single-mode fiber having a core diameter of 9 µm can be widened to a parallel light beam having a diameter of 0.1 mm. This light beam now enters from the first collimator arrangement with adapter element into the inner space of the rotating data transmission device. This is filled, for example, with an oil having a lower refractive index when compared with the refractive index of the first collimator arrangement with adapter element 10.

The first collimator arrangement with adapter element 10 has a cone-shaped contour, with the conical surface being oriented so that the apex of the cone points in the direction of the Dove prism. Because of the low refractive index, the light ray is deflected radially inwards, i.e. downwards as seen in our sectional view. The light ray now enters into the first prism adapter element 11 with higher refractive index slightly more inwards, i.e. slightly further downwards as seen in our illustration, and is deflected accordingly. The new direction of the light ray is now parallel to the original direction in the first collimator arrangement, however it is displaced radially inwards, or downwards in our illustration. The optical effect of the arrangement corresponds to that of a plane-parallel plate. The deflection of the beam in a Dove prism is known from prior art. The refraction of the beam when entering the prism is governed by the ratio of the refractive indices of the prism adapter element 11 and the Dove prism 1 itself.

In the present example, the Dove prism has a lower refractive index than the first prism adapter element 11. Similarly, of course, a Dove prism having a higher refractive index could be used. In this case the light would be deflected to the other side by refraction upon entering the prism. After passing through the Dove prism 1, the light ray is again refracted according to the refractive index ratios when passing into the second prism adapter element. In the second prism adapter element 12 the light ray now passes again parallel to the ray path in the first prism adapter element 11, and thus parallel to the rotation axis 6, however it is displaced according to the imaging function of the Dove prism 1. When emerging from the second prism adapter element 12 into the inner space of the rotating data transmission device, which is filled with oil having a lower refractive index, the light is deflected outwards in radial direction, i.e. downwards as seen in the sectional view. Upon renewed entry into a medium having a higher refractive index, which is the second collimator arrangement with adapter element, a deflection again occurs into a ray path parallel to the rotation axis. Owing to the double radial deflection, first inwards and then outwards, the ray again passes at a position having the original radius and can be coupled into a corresponding second light-waveguide 3 by collimators.

The present example relates to an embodiment in which the materials of the adapter elements of the collimator arrangements and the prism adapter elements have the same refractive index. Furthermore, the distances between the first collimator arrangement with adapter element 10 and the first prism adapter element 11, and also between the second prism adapter element 12 and the second collimator arrangement with adapter element 13, are equal. Basically, materials having different refractive indices also may be used. For this, however, the angles of the conical surfaces must be suitably adapted, so that the spreading of the light rays inside the prism adapter elements extends parallel to the light rays coupled into the collimator arrangement. Similarly, an adaptation through variation of the distances between a collimator arrangement and a prism adapter element would be possible.

Figure 2:
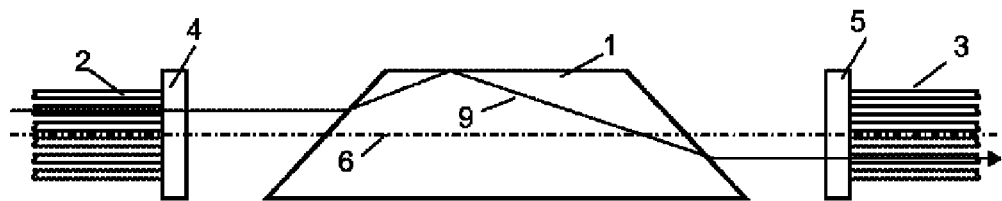
FIG. 2 shows an example of an arrangement in accordance with prior art.

FIG. 2 shows in a schematic form an arrangement in accordance with prior art. The optical rotating data transmission device comprises a first collimator arrangement 4 for coupling-on first light-waveguides 2, and also a second collimator arrangement for 5 for coupling-on second light-waveguides 3. The second collimator arrangement 5 is supported to be rotatable with respect to the first collimator arrangement 4 about a rotation axis 6. For compensation of the rotational movement, a derotating element in the form of a Dove prism 1 is located in the ray path between the first collimator arrangement 4 and the second collimator arrangement 5. An example is shown of a ray path of a light ray 9 that starts from first light-waveguides 2, extends via the first collimator arrangement 4, and passes through the Dove prism 1 and via the second collimator arrangement 5 as far as into the second light-waveguide 3.

Figure 3:
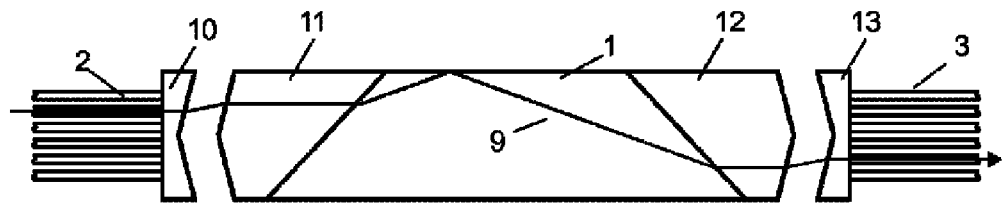
FIG. 3 shows another embodiment of an arrangement in accordance with the invention.

FIG. 3 schematically shows a sectional view of another arrangement in accordance with the invention. The illustration substantially corresponds to that of FIG. 1. As distinct from this, however, the first collimator arrangement with adapter element 10 and also the second collimator arrangement with adapter arrangement 13 are configured to be cone-shaped on their sides facing the prism 1, wherein the cones project into the faces of the collimator arrangement. Accordingly, the faces of the prism adapter elements directed towards the collimator arrangements are configured to be inverse to the assigned adapter elements of the collimator arrangements. In this case, conical end faces have been formed, which face outwards in the direction of the collimator arrangements.

Figure 4:
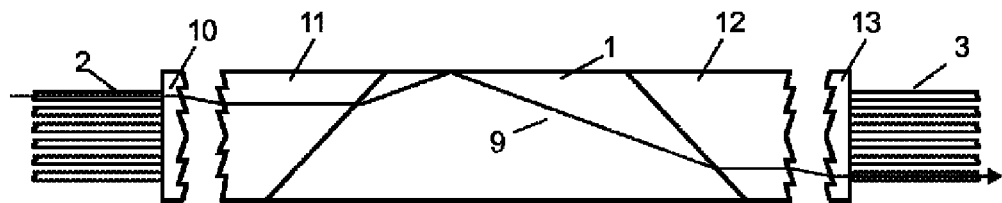
FIG. 4 shows another embodiment of an arrangement in accordance with the invention, in which adapter elements are designed in the form of Fresnel lenses.

FIG. 4 schematically shows a sectional view of another arrangement in accordance with the invention, in which the adapter elements are configured in the form of Fresnel lenses. As distinct from real Fresnel lenses, the individual segments are not arch-shaped; rather than this they represent conical segments. Here too, the geometry of the prism adapter elements is inverse to that of the adapter elements of the collimator arrangements.

Figure 5:
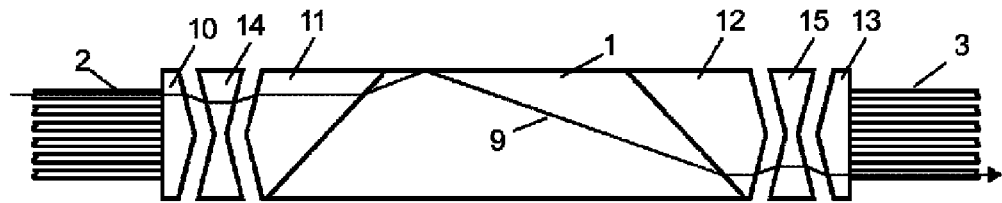
FIG. 5 shows another embodiment of an arrangement in accordance with the invention, in which intermediate elements are additionally provided.

FIG. 5 shows another embodiment of an arrangement in accordance with the invention, in which intermediate elements 14, 15 are provided additionally between the collimator adapter elements 10, 13 and the prism adapter elements 11, 12. Here, similarly to FIG. 1, a light ray coming from the first collimator arrangement with adapter element 10 is first radially displaced in the direction of the rotation axis upon transition into a first intermediate element 14. Upon a second transition from the first intermediate element 14 into the first prism adapter element 11 the light ray is brought back into the original radial position. The light beam now spreads out in the same axis in the first prism adapter element 11 as in the first collimator arrangement with adapter element 10. A prerequisite for this is an adaptation of the refractive indices of the first collimator arrangement with adapter element 10, the first intermediate element 14, and the first prism adapter element 11, taking into consideration the distances between these elements. Preferably the refractive indices are equal, and the distances also are equal. As the light ray which enters into the prism 1 has the same axis as the same light ray in the first collimator arrangement with adapter element 10, a correction on the other side of the prism is not possible. Here however, in an advantageous manner an identical arrangement can be effected. Furthermore, also in the arrangement on one side of the prism a certain ray displacement in the prism could be effected, which is again compensated by the arrangement on the other side. This effect can be utilized for temperature compensation of the arrangement.

Figure 6:
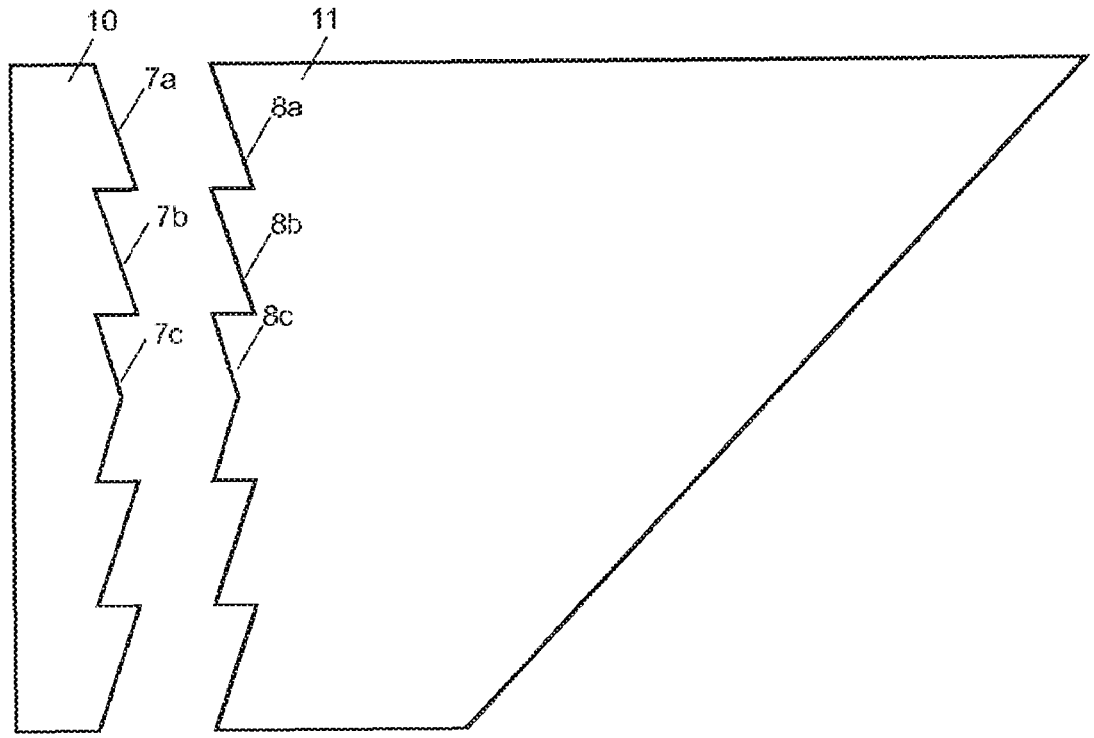
FIG. 6 shows a detail of FIG. 4 in a magnified illustration.

FIG. 6 shows a detail of FIG. 4 in a magnified illustration. In this, conical faces 7a, 7b and 7c of the first collimator arrangement with adapter element 10 can be seen in accordance with the lateral section along the rotation axis 6. Similarly, the first prism adapter element 11 formed with an inverse surface contour and having conical faces 8a, 8b and 8c extending in the opposite direction can be seen. The difference from Fresnel lenses is particularly evident here. Thus, the contours of the conical faces are straight, whilst with Fresnel lenses the contours would have a curvature corresponding to the lens contour. Basically, arrangements having a different number of conical faces, or different conical faces, could be used. Similarly, conical faces projecting into or from each side of the arrangement could be used optionally. A basic requisite for the functioning of the invention is always that the conical faces of the collimator arrangements and the prism adapter elements are inverse with respect to each other.

Figure 7:
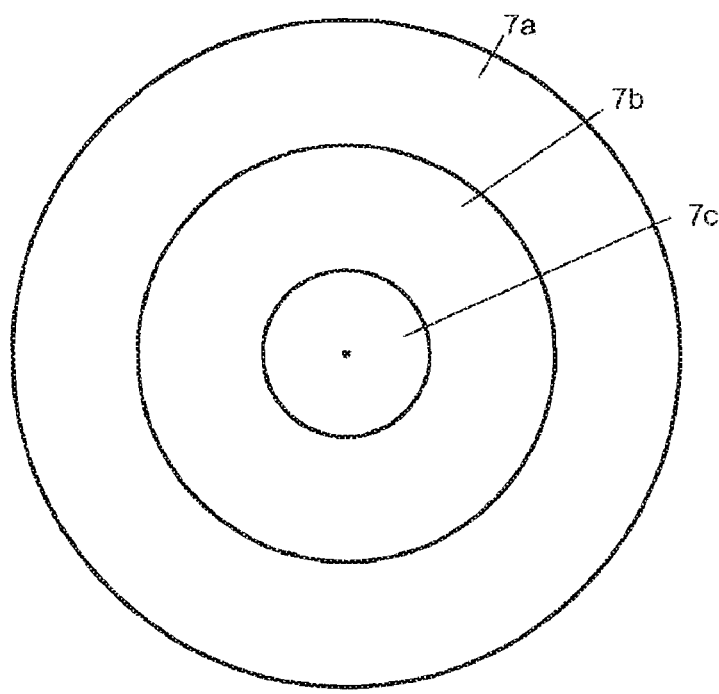
FIG. 7 shows a plan view of the first collimator arrangement with an adapter element 10 of FIG. 5.

FIG. 7 shows a plan view of the first collimator arrangement with adapter element 10 of FIG. 5. Here the conical faces 7a, 7b and 7c corresponding to the projection in the plan view can be seen as circular disks.

For a description of the invention, reference is made to collimator arrangements with adapter elements 10 and 13. It is not of importance for the invention whether the collimator arrangement is combined with a suitable adapter element as a separate constructional component, or whether the adapter element is already incorporated in the collimator arrangement.

Various embodiments of the collimator arrangements with adapter elements 10 and 13 are possible. For example, the collimator arrangements may be configured as a micro-optical element or a micro-lens array (MLA). In such a case, optionally a suitable adapter element can be attached to the micro-optical element. However, it is particularly expedient for the micro-optical element to be designed to have already a suitable shape.

As an alternative to this, by way of example, also a collimator arrangement having discrete collimators can be used, for example as disclosed in U.S. Pat. No. 5,568,578. For this, a suitable adapter element is disposed in front of the collimator arrangement.

The invention is basically applicable to all derotating optical elements. For the sake of demonstration, reference is here made to a Dove prism. Similarly, an Abbe-König prism is also usable as a derotating element.

The invention claimed is:

1. Optical rotating data transmission device comprising:
   at least one first collimator arrangement for coupling-on first light-waveguides;
   at least one second collimator arrangement for coupling-on second light-waveguides, which is supported to be rotatable relative to the first collimator arrangement about a rotation axis;
   a derotating optical element located in a light path between the first collimator arrangement and the second collimator arrangement;
   a first prism adapter element and a second prism adapter element located in the light path, each disposed on a respective side of the one derotating optical element; and
   wherein the collimator arrangements comprise adapter elements located in the light path and having on their sides facing the one derotating optical element at least one rotationally symmetrical conical face, and the prism adapter elements have faces configured to be inverse thereto, each comprising at least one rotationally symmetrical and oppositely directed conical face.

2. Device according to claim 1, wherein the derotating optical element is a Dove prism.

3. Device according to claim 1, wherein the derotating optical element is an Abbe-König prism.

4. Device according to claim 1, wherein the collimator arrangements have adapter elements, the conical faces of which project from the collimator arrangements in the direction of the derotating optical elements, and the prism adapter elements have conical faces that project into the adapter elements in the direction of the derotating optical element.

5. Device according to claim 1, wherein the collimator arrangements have adapter elements, the conical faces of which project into the collimator arrangements in the direction of the light-waveguides, and the prism adapter elements have conical faces that project from the adapter elements in the direction of the collimator arrangements.

6. Device according to claim 1, wherein the collimator arrangements have adapter elements with a plurality of conical faces, and the prism adapter elements have the same number of conical faces.

7. Device according to claim 1, wherein the collimator arrangements are provided with separate adapter elements.

8. Device according to claim 1, wherein the adapter elements of the collimator arrangements are incorporated in the collimator arrangements.

9. Device according to claim 1, wherein the at least one rotationally symmetrical conical face of the adapter element further comprises a micro-lens array.

* * * * *